(12) United States Patent
Thomas et al.

(10) Patent No.: US 12,539,956 B2
(45) Date of Patent: Feb. 3, 2026

(54) THERMAL AND ACOUSTIC INSULATION SYSTEM FOR AN AIRCRAFT

(71) Applicants: Airbus Operations GmbH, Hamburg (DE); Airbus SAS, Blagnac (FR)

(72) Inventors: Christian Thomas, Hamburg (DE); Alois Friedberger, Taufkirchen (DE); Wolfgang Machunze, Taufkirchen (DE); Andreas Helwig, Taufkirchen (DE); Tassilo Witte, Hamburg (DE); Elmar Bonaccurso, Taufkirchen (DE)

(73) Assignees: Airbus Operations GmbH, Hamburg (DE); Airbus SAS, Blagnac (FR)

( * ) Notice: Subject to any disclaimer, the term of this patent is extended or adjusted under 35 U.S.C. 154(b) by 195 days.

(21) Appl. No.: 18/475,597

(22) Filed: Sep. 27, 2023

(65) Prior Publication Data

US 2024/0109640 A1 Apr. 4, 2024

(30) Foreign Application Priority Data

Sep. 29, 2022 (EP) .................. 22198876

(51) Int. Cl.
*B64C 1/06* (2006.01)
*B64C 1/40* (2006.01)

(52) U.S. Cl.
CPC ............... *B64C 1/067* (2013.01); *B64C 1/40* (2013.01)

(58) Field of Classification Search
CPC . B64C 1/067; B64C 1/40; B60R 13/08; F16L 59/026
See application file for complete search history.

(56) References Cited

U.S. PATENT DOCUMENTS

| 5,398,889 A | 3/1995 | White et al. |
| 2009/0159747 A1 | 6/2009 | Jorn |
| 2009/0274892 A1* | 11/2009 | Qin ............... C08J 9/40 427/244 |

(Continued)

FOREIGN PATENT DOCUMENTS

| EP | 3594187 A1 | 1/2020 |
| EP | 3696082 A1 | 8/2020 |
| JP | 2001286162 A * | 10/2001 |

OTHER PUBLICATIONS

Translation of JP 2001286162 A (Year: 2001).*
European Search Report for corresponding European Patent Application No. 22198876 dated Feb. 27, 2023.

*Primary Examiner* — Joshua J Michener
*Assistant Examiner* — Colin Zohoori
(74) *Attorney, Agent, or Firm* — Greer, Burns & Crain, Ltd.

(57) ABSTRACT

A thermal and acoustic insulation system for an aircraft, to be received between an inner surface of an aircraft primary structure, such as an aircraft fuselage structure, and a surface of a panel arrangement delimiting an aircraft cabin, the surface facing away from the aircraft cabin, comprises an insulation package and at least one sensor adapted to measure a level of humidity present in the insulation package. The insulation package comprises a core layer having a thermal and acoustic damping performance, and a packing layer enclosing the core layer. The packing layer is provided with a plurality of normally closed and selectively openable drainage openings which are actuatable to change between their normally closed state and an open state.

17 Claims, 3 Drawing Sheets

(56) References Cited

U.S. PATENT DOCUMENTS

| | | | |
|---|---|---|---|
| 2011/0009042 A1* | 1/2011 | Joern | B64C 1/067 454/71 |
| 2018/0002030 A1* | 1/2018 | Klassen | B64C 1/18 |
| 2020/0001962 A1 | 1/2020 | Wesseloh et al. | |
| 2020/0262538 A1 | 8/2020 | Lemery | |

* cited by examiner

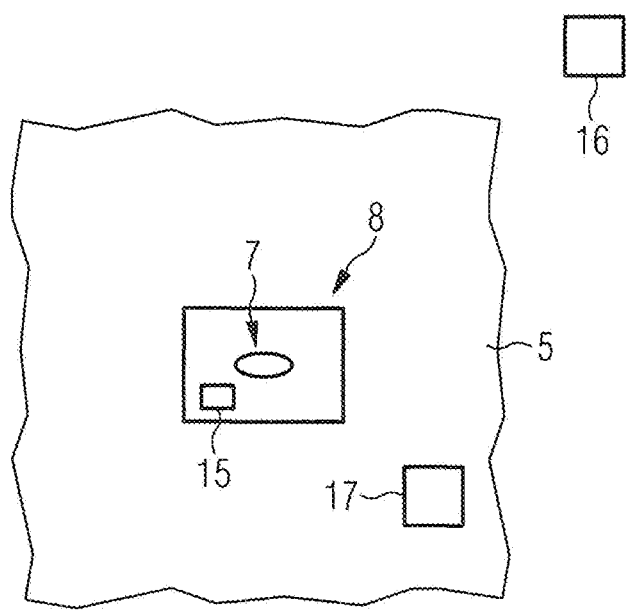

THERMAL AND ACOUSTIC INSULATION SYSTEM FOR AN AIRCRAFT

CROSS-REFERENCES TO RELATED APPLICATIONS

This application claims the benefit of European Patent Application Number 22198876.9 filed on Sep. 29, 2022, the entire disclosure of which is incorporated herein by way of reference.

FIELD OF THE INVENTION

The present invention relates to the field of thermal and acoustic insulation for an aircraft, such as a passenger aircraft or a helicopter.

In particular, the invention deals with the constant assurance of thermal and acoustic comfort for passengers and crew members in an aircraft.

BACKGROUND OF THE INVENTION

For reducing a level of noise in an aircraft the use of materials having acoustic absorption properties, i.e., materials having the effect of reducing the intensity of sound waves by causing accelerated damping of said waves, is a known measure. Glass wool in the form of a blanket is one example for such materials which is known to be used in aircraft cabin walls between a structural lining of a fuselage and cabin delimiting panels. Such a blanket containing glass wool has a double function of thermal insulation and acoustic absorption.

A problem to be dealt with in the field of aircraft insulation is the accumulation of condensed water within glass wool blankets. A soaked glass wool blanket has a significantly increased weight compared to a dry glass wool blanket, and the thermal and acoustic insulation properties of a soaked glass wool blanket are significantly decreased. Thus, a soaked glass wool blanket is undesired on board an aircraft. As with the known glass wool blankets, water intake, especially in the form of water vapor, cannot be completely prevented, glass wool blankets are to be checked at regular intervals for need of dehumidification or change in order to keep the aircraft weight as low as possible so as to balance flight economy and in order to ensure proper thermal and acoustic damping. Such necessity for regular check intervals significantly increases the maintenance effort.

SUMMARY OF THE INVENTION

Therefore, it is an object of the present invention to provide a thermal and acoustic insulation system for an aircraft which allows keeping the thermal and acoustic comfort for passengers and crew members at a desired high level over the whole lifetime of the insulation while only requiring a minimal installation effort, similar to the effort necessary for the installation of known glass wool blankets, and while only necessitating on-demand maintenance.

This object may be solved by the thermal and acoustic insulation system for an aircraft as described herein, as well as with an aircraft comprising said thermal and acoustic insulation system.

The thermal and acoustic insulation system is adapted for installation in an aircraft, such as, for example, a passenger aircraft or a helicopter. For installation, the system is adapted to be received between an inner surface of an aircraft primary structure, such as an aircraft fuselage structure, and a surface of a panel arrangement delimiting an aircraft cabin, the surface facing away from the aircraft cabin. Thus, the system is adapted to replace blankets of glass wool commonly used in aircrafts to provide for thermal and acoustic insulation.

The system comprises an insulation package comprising a core layer having a thermal and acoustic damping performance, and a packing layer enclosing the core layer. The packing layer completely encloses the core layer in a manner to protect the core layer from the surrounding environment of the insulation package and preferably also contributes to maintaining the core layer in a desired, especially planar and, e.g., blanket-like shape. Desirably, the packing layer protects the core layer from water ingress—even though a complete prevention of water ingress usually cannot be achieved. In view of preventing water ingress into the insulation package to the extent possible, it can also be advantageous to provide the packing layer and optionally also the core layer with a hydrophobic coating. Of course, also an additional or alternative coating is conceivable, e.g. a coating enhancing the fire resistance of the multilayer structure.

The system further comprises at least one sensor adapted to measure a level of humidity present in the insulation package and, especially, in the core layer. An example for the at least one sensor for measuring the humidity in the insulation package is a humidity sensor or a conductivity sensor. If more than one sensor is present, these may be all of the same kind or different ones, e.g., humidity and conductivity sensors. The provision of such at least one sensor helps to deal with the problem of water ingress into the insulation package. As discussed above, water ingress cannot be completely avoided so that more and more water accumulates within the insulation package during its lifetime, resulting in an increase of the overall weight of the insulation system. The at least one sensor is adapted to measure the humidity within the insulation package and thereby supports maintenance on demand to drain the insulation package as required.

The at least one sensor preferably is formed integrally with the insulation package. Especially, the at least one sensor can be formed on a surface of the packing layer facing the core layer or, when the packing layer comprises multiple layers, may be received between layers of the packing layer. It is also conceivable to use thin film deposition techniques for integration of the at least one sensor in the insulation package. Thereby, the at least one sensor is formed as integral part of the packing layer of the insulation package. Known thin film deposition techniques which can be used are, for example, chemical vapor deposition and physical vapor deposition. Especially, the sensor may be integrated in the insulation package analogue to the integration of a functional component into the multilayer structure described in the patent application from the inventors of the present application and entitled "Multifunctional thermal and acoustic insulation system".

To realize a humidity measurement over an entire width and length extension of the insulation package, a plurality of sensors are preferably integrated in a distributed manner, especially a substantially equally distributed manner, in the insulation package. Due to the accumulation of condensed water in the lower part of the insulation package (relative to the gravity direction when installed), it can be sufficient to integrate a plurality of sensors only in said lower part of the insulation package; preferably in a distributed and especially in a substantially equally distributed manner.

The at least one sensor preferably is self-powered, i.e., needs no wiring connection to a power supply. Such self-powering can be achieved by applying energy harvesting mechanisms. Data transfer is preferably also realized wirelessly. Thereby the elaborate installation of wiring and harnesses and also an increase of weight can be avoided. Such self-powering mechanism may be based on the thermoelectrical effect, vibration harvesting or harvesting of radio frequency (RF) radiation. However, there may also be a physical interconnection in the form of at least one conductive track provided on a surface of the packing layer, e.g. realized via metallization of the layer surface of the packing layer in the region of the conductive track(s).

Further, the packing layer of the insulation package is provided with a plurality of normally closed and selectively openable drainage openings which are actuatable to change between their normally closed state and an open state to allow for selective dehumidification of the insulation package on demand. The drainage openings may be pores of a material forming the packing layer. Alternatively or in addition, it is conceivable that the packing layer is provided with a plurality of functional units, each functional unit comprising at least one of the plurality of actuatable drainage openings. The functional units can be provided on a surface of the packing layer, i.e., a surface facing the core layer or an (opposite) outer surface of the packing layer, or, when the packing layer comprises multiple layers, may be received between layers of the packing layer. Of course, the packing layer then has to be formed with a cutout or through hole in the region the functional unit is provided.

Preferably, the actuatable drainage openings are stable in each of the normally closed and selectively open states. In other words, the actuatable openings preferably are bistable.

At least one of the actuatable drainage openings or all can be adapted to be passively actuated. In this regard, it is conceivable that at least one passively actuatable drainage opening is responsive to a change in an environment surrounding the passively actuatable drainage opening.

For example, transferal of the at least one passively actuatable drainage opening from the normally closed to the selectively open state is triggered by a temperature stimulus. With such passive actuation example, the at least one drainage opening opens when a predefined temperature is reached. The predefined temperature can be a temperature lower or higher than the temperature present in the insulation package. To measure the temperature present in the insulation package, the system may further comprise at least one temperature sensor, said temperature sensor providing temperature measurement data on which said passive actuation can be based. For the predefined temperature being higher than the temperature present in the insulation package, the insulation package is heated up until said predefined temperature is reached, wherein the predefined high temperature is chosen such that the water accumulated within the insulation package is transferred to water vapor. Thus, the opening(s) triggered to open when said predefined high temperature is reached allow the water vapor to leave the insulation package through the open drainage opening(s). In case the predefined temperature is lower than the temperature present in the insulation package, the insulation package is cooled down until said predefined temperature is reached, wherein the predefined low temperature is chosen such that the water present within the insulation package condenses and aggregates on a bottom of the insulation package (with regard to a gravity direction of the installed insulation package). Thus, the opening(s) triggered to open when said predefined low temperature is reached allow the condensed water to leave the insulation package through the open drainage opening(s).

For the predefined high temperature, at least one passively actuable drainage opening may be actuated to open especially in the middle and/or upper region of the insulation package (with regard to a gravity direction of the installed insulation package) or over the overall length and width extension of the insulation package. For the predefined lower temperature, at least one passively actutable drainage opening may be actuated to open especially in the lower region of the insulation package (with regard to a gravity direction of the installed insulation package) where the condensed water accumulates. As a consequence, the packing layer may be provided with different passively actuable drainage openings, namely a (first) group of at least one drainage opening present in the middle and/or upper region of the insulation package or present all over the insulation package, which is responsive to the higher temperature stimulus, and a (second) group of at least one drainage opening present in the lower region of the insulation package, which are responsive to the lower temperature stimulus.

As another example for at least one of the passively actuatable drainage openings being responsive to a change in an environment surrounding the passively actuatable drainage opening(s), the drainage opening(s) can function similar to stomata in leaves in nature. Transferal of the passively actuatable drainage opening(s) from the normally closed to the selectively open state is triggered by a humidity stimulus in this regard. With such passive actuation example, the at least one drainage opening opens when a predefined humidity is present in the environment surrounding the drainage opening(s). The predefined humidity can be a humidity lower or higher than the humidity present in the insulation package. An additional sensor for measuring the humidity outside the insulation package can be provided, wherein the system then is adapted to provide humidity measurement data on which said passive actuation can be based.

At least one of the actuatable drainage openings or all can be adapted to be actively actuated. In this regard, it is conceivable that at least one of the actively actuatable drainage openings is responsive to an actuation mechanism which may be also integrated in the insulation package. It is conceivable that one actuation mechanism is adapted to actuate one or more actively actuated drainage openings, all actively actuated drainage openings of one kind are actuatable by a single common actuation mechanism or each actively actuatable drainage opening is actuatable by its own actuation mechanism. A control unit (adapted to communicate with the actuation mechanism, if present,) can be provided to control a status change of the actively actuatable drainage opening(s). Said active actuation can be based on data of the at least one "inside" humidity sensor, i.e., the sensor adapted to measure the humidity inside the insulation package and/or, if present, the at least one temperature and/or the "outside" humidity sensor, i.e., the sensor adapted to measure the humidity in an environment surrounding the insulation package. In fact, actively controlled dehumidification preferably also considers characteristics of the surrounding environment to only allow actively actuate the drainage opening(s) for dehumidification if the environmental conditions are optimal.

For example, transferal of the actively actuatable drainage opening(s) from the normally closed to the selectively open state is actuated by an electric voltage stimulus. With such active actuation example, the at least one drainage opening opens when a predefined electric voltage is applied to the drainage opening, the functional unit comprising the drainage opening and/or the material including the drainage opening pores. For example, the actuation and, especially, the actuation mechanism, can be based on electro-active polymer (EAP) material, where the application of a predefined voltage to the material triggers a change of the material in shape, which in turn, causes the drainage opening(s) to open. The control unit can control the application of the voltage to the drainage opening(s).

Another example for the opening of the at least one drainage opening upon application of a predefined electric voltage is the use of an osmotic foil as the packing layer. The osmotic foil is a membrane having a first electrode on a first surface thereof and a second electrode at a second opposite surface thereof. In detail, the osmotic foil can be a polymer membrane, preferably with a thickness of only 20 lam, which is coated on both sides with a noble metal, such as gold, especially by means of plasma coating. When applying a voltage of around 1.5 volts to the electrodes, an active transport of liquid from inside of the insulation package to the outside can be realized by means of an electroosmotic effect. Use of the electroosmotic effect for water transfer through a foil is described in the Airbus patent EP 3 594 187. The control unit can control the application of the voltage to the electrodes.

To support the dehumidification of the insulation package, at least two drainage openings are to be in their open state (so that no negative pressure within the insulation package prevents dehumidification). Moreover, ventilation of the insulation package is advantageous.

Generally, in case the stimulus is no longer present, the at least one drainage opening automatically changes back to its normally closed state.

It is conceivable that only at least one section of the packing layer is provided with drainage openings. Moreover, different kinds of drainage openings can be provided in different sections of the packing layer; for example, the above described different passively or actively actuatable drainage openings. Alternatively or additionally, actively and passively actuatable drainage openings may be provided in the packing layer and, especially, in same section(s) thereof, i.e., in at least one common section. Preferably, in dependence of the actuation principle or principles underlying the drainage openings, the drainage openings are provided in one or more sections of the packing layer in which water or water vapor is adapted to accumulate. Also the location of the at least one sensor is preferably chosen in dependence of the actuation principle(s) underlying the drainage openings and, especially, so as to support the dehumidification. In fact, the location of the at least one sensor preferably is in the at least one section of the packing layer the at least one drainage opening is present according to the actuation principle(s) underlying the drainage opening(s). For example, the presence or final absence of water (vapor) in the insulation package during dehumidification is advantageously detected in the regions water (vapor) accumulates within the insulation package.

The inclusion of the at least one sensor in the insulation package and the drainage openings into the packing layer make the insulation package multifunctional. In other words, the claimed insulation system has functions exceeding mere thermal and acoustic insulation properties.

When not yet installed in an aircraft, the insulation package preferably has a planar and flexible shape. A planar shape is herein understood to provide an extension in width and length directions which is respectively greater than an extension in a thickness direction. According to one embodiment, the length extension is greater than the width extension. According to another embodiment, the length extension is smaller than the width extension.

For the insulation package to be flexible, of course, each of its layers has to be flexible itself. The packing layer can be a flexible foil and the core layer preferably comprises acoustic and thermal insulation material, for example, glass wool. Just as an example for the flexibility of the insulation package, the non-installed insulation package may be provided rolled up for an easy handling. When installed in an aircraft, the flexibility of the insulation package preferably allows conformation of the package to a shape of the inner surface of an aircraft structure, such as the inner fuselage surface, with a high accuracy of fit. Generally, the insulation package is adaptable in shape to a surface the system is to be attached. This allows for an installation taking as less space as possible.

An aircraft according to one or more embodiments comprises an aircraft primary structure, such as an aircraft fuselage structure, and a panel structure delimiting an aircraft cabin. Further, the aircraft may comprise the above-described thermal and acoustic insulation system received between an inner surface of the aircraft primary structure and a panel structure surface facing away from the aircraft cabin.

In order to support a dehumidification of the insulation package, the aircraft can further comprise a ventilation device arranged and adapted to ventilate the insulation package of the thermal and acoustic insulation system when at least two drainage openings are in the open state, wherein ventilation air is adapted to enter the insulation package through at least one first drainage opening and exits the insulation package through at least one second drainage opening.

In sum, the following positive effects can be achieved by the above-described thermal and acoustic insulation system:

Dehumidifying functionality is already considered during the design phase and implemented during the manufacturing phase so that the need for replacement of soaked insulation is reduced to a minimum and maintenance is only necessary on demand.

As described above, the sensor(s) for monitoring the humidity and/or temperature inside and/or in an environment surrounding the insulation package enable sophisticated maintenance concepts.

Dehumidifying is possible on demand and when environmental conditions are optimal and ventilation is possible, such as, e.g., on ground, during check, etc.

A combination of the dehumidifying functionality with customized materials for aircraft application according to given regulations is possible.

BRIEF DESCRIPTION OF THE DRAWINGS

A detailed description of an exemplary embodiment of the claimed thermal and acoustic insulation system provided in an aircraft is given in the following with reference to the figures which show schematically:

FIG. 5 the detailed front view of the packing layer section of FIG. 4, with the drainage opening shown in its open state.

DETAILED DESCRIPTION OF THE PREFERRED EMBODIMENT

Figure 1:
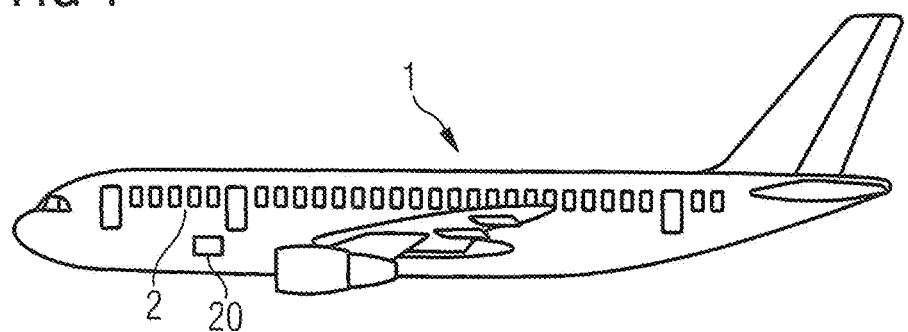
FIG. 1 a general view of an aircraft, in this case a civil transport jet airplane.

In FIG. 1, an aircraft 1, especially a civil transport jet airplane, having a fuselage 2 is shown. The aircraft 1 comprises a ventilation device 20 arranged and adapted to ventilate a thermal and acoustic insulation system 3 of the aircraft 1, as shown in FIG. 2.

Figure 2:
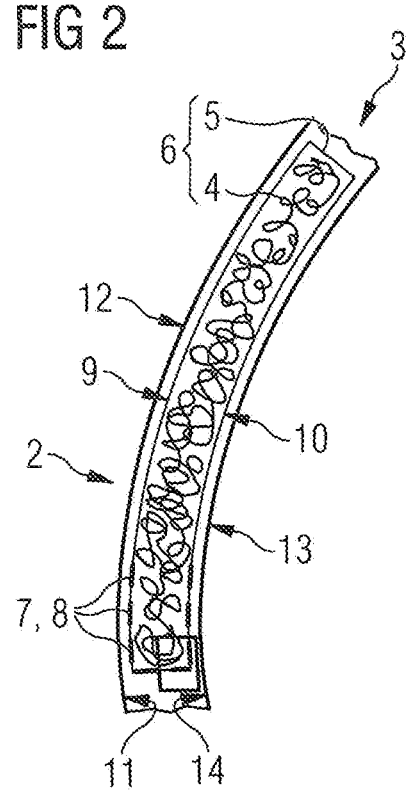
FIG. 2 a section of a cross-section through a fuselage of the aircraft of FIG. 1, illustrating a cross-section through the thermal and acoustic insulation system installed in the aircraft.

As illustrated in FIG. 2 and already mentioned above, said aircraft 1 is provided with a thermal and acoustic insulation system 3. Said thermal and acoustic insulation system 3 is of the kind generally described in the foregoing. In the embodiment shown in FIG. 2, the thermal and acoustic insulation system 3 comprises a core layer 4 of glass wool enclosed by a packing layer 5 which is a multilayer foil. Together, the core layer 4 and packing layer 5 form an insulation package 6. According to FIG. 2, the insulation package 6 is provided with a plurality of drainage openings 7 only in its lower part (with regard to the direction of gravity in the installed position of the insulation package 6). Each drainage opening 7 is part of a separate functional unit 8 integrated between layers 5a, 5b of the multilayer foil. In the installed position of the thermal and acoustic insulation system 3 as shown in FIG. 2, opposite outer surfaces 9, 10 of packing layer 5 face the inner surface 11 of an outer skin 12 of the aircraft fuselage 2 and a cabin side wall 13, especially a surface 14 thereof facing away from an aircraft cabin, respectively.

Figure 3:
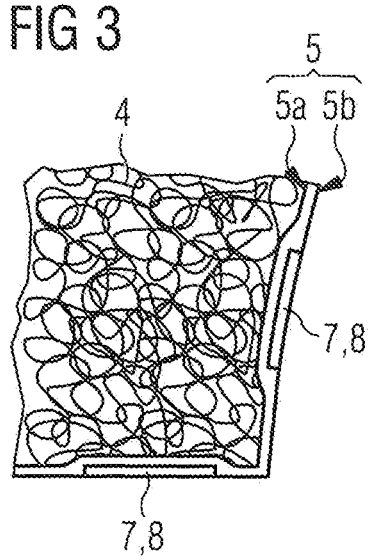
FIG. 3 a detailed cross-sectional side view of an enlarged section of the thermal and acoustic insulation system of FIG. 2.

FIG. 3 gives a detailed cross-sectional side view of an enlarged partial section of the insulation package 6 of FIG. 2, the partial section enlarged in FIG. 3 is marked by a box in FIG. 2 and the sections of the aircraft fuselage outer skin 12 and the cabin side wall 13 present in the detailed cross-sectional side view of FIG. 2 are omitted. Said enlarged partial section shows two functional units 8 integrated between two layers 5a, 5b of the packing layer 6 in a bottom section and a lower side section thereof.

Figure 4:
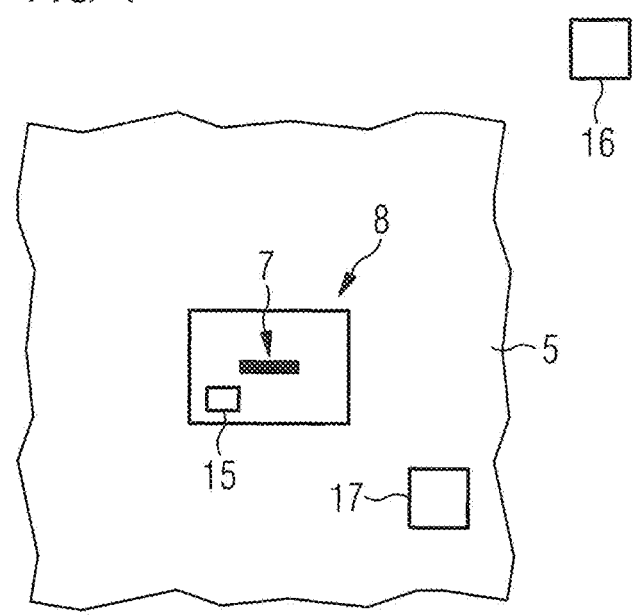
FIG. 4 a detailed front view of a packing layer section of the enlarged section of FIG. 3, provided with a drainage opening shown in its closed state.

FIG. 4 gives a detailed front view of a packing layer section of the enlarged section of FIG. 3, provided with a drainage opening 7 shown in its closed state. The drainage opening 7 is part of a functional unit 8. According to FIG. 4, the functional unit 8 comprises an actively actuatable drainage opening 7 and an actuation mechanism 15 for actuating the drainage opening 7 to transfer from its closed state to its open state. The actuation mechanism 15 is in communication with a control unit 16 of the insulation system 3 which in turn is in communication with a humidity sensor 17 of the insulation package 6. The control unit 16 is adapted to control the actuation mechanism 15 to open the drainage opening 7 in dependence of a data signal of the humidity sensor 17.

FIG. 5 shows the drainage opening 7 of FIG. 3 in its open position. Thus, FIG. 5 shows the drainage opening 7 in a state in which dehumidification of the insulation package 6 takes place.

The systems and devices described herein may include a control unit, controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A thermal and acoustic insulation system for an aircraft, the system configured to be received between an inner surface of an aircraft primary structure, and a surface of a panel arrangement delimiting an aircraft cabin, and the system comprising:
    an insulation package comprising:
        a core layer having a thermal and acoustic damping performance, and
        a packing layer enclosing the core layer; and
    at least one sensor configured to measure a level of humidity present in the insulation package; and
    a control unit;
    wherein the packing layer is provided with a plurality of selectively openable drainage openings which are actuatable to change between a normally closed state and an open state to allow for selective dehumidification of the insulation package on demand, and
    wherein at least one of the selectively openable drainage openings is configured to be actively actuated, and wherein the control unit is configured to control a status change of the actively actuatable selectively openable drainage opening based on data of the at least one sensor.

2. The thermal and acoustic insulation system of claim 1, wherein the packing layer is provided with a plurality of functional units, each functional unit comprising at least one of the selectively openable drainage openings.

3. The thermal and acoustic insulation system of claim 1, wherein the at least one sensor is formed integrally with the insulation package.

4. The thermal and acoustic insulation system of claim 1, wherein the selectively openable drainage openings are stable in each of the closed and open states.

5. The thermal and acoustic insulation system of claim 1, wherein at least one of the selectively openable drainage openings is configured to be passively actuated.

6. The thermal and acoustic insulation system of claim 5, wherein the at least one passively actuated drainage opening is responsive to a change in an environment surrounding the at least one passively actuated drainage opening.

7. The thermal and acoustic insulation system of claim 1, wherein
    said at least one actively actuated selectively openable drainage opening differs from a passively actuated drainage opening.

8. The thermal and acoustic insulation system of claim 7, further comprising:
    an actuation mechanism for actuating the at least one actively actuatable selectively openable drainage opening.

9. The thermal and acoustic insulation system of claim 7, wherein the at least one actively actuatable selectively openable drainage opening is responsive to application of an electric voltage.

10. The thermal and acoustic insulation system of claim 9, wherein the at least one actively actuatable selectively openable drainage opening is responsive to application of an electric voltage comprises an electro-active polymer opening.

11. The thermal and acoustic insulation system of claim 1, wherein the selectively openable drainage openings are provided only in sections of the insulation package, said sections being sections of the insulation package in a region in which water, water vapor, or both are configured to accumulate within the insulation package.

12. The thermal and acoustic insulation system of claim 11, wherein the at least one sensor is only provided in the sections of the insulation package.

13. The thermal and acoustic insulation system of claim 1, wherein the insulation package is flexible and configured to be shaped to a surface of a structure the system attached thereto.

14. The thermal and acoustic insulation system of claim 1, wherein the packing layer of the insulation package is a flexible foil;
    wherein at least one of the packing layer and a material of the core layer has a coating; or
    both.

15. The thermal and acoustic insulation system of claim 1, wherein at least one of the packing layer and a material of the core layer has a hydrophobic coating.

16. An aircraft comprising:
    an aircraft primary structure,
    a panel structure delimiting an aircraft cabin, and
    the thermal and acoustic insulation system of claim 1,
    wherein the thermal and acoustic insulation system is received between an inner surface of the aircraft primary structure and a panel structure surface facing away from the aircraft cabin.

17. The aircraft according to claim 16, further comprising:
    a ventilation device configured to ventilate the insulation package of the thermal and acoustic insulation system when at least two selectively openable drainage openings are in the open state,
    wherein ventilation air is configured to enter the insulation package through at least one first selectively openable drainage opening and exit the insulation package through at least one second selectively openable drainage opening.

* * * * *